Nov. 4, 1941.                R. C. ZUCKERMAN ET AL                2,261,324
                                  BEET TOPPER
                         Filed Dec. 5, 1939        5 Sheets-Sheet 1

INVENTOR
R.C. Zuckerman
H.N. Bagley
Webster & Webster
ATTORNEYS

Nov. 4, 1941.  R. C. ZUCKERMAN ET AL  2,261,324
BEET TOPPER
Filed Dec. 5, 1939   5 Sheets-Sheet 4

INVENTORS
R. C. Zuckerman
H. N. Bagley
BY
Webster & Webster
ATTORNEYS

Nov. 4, 1941.  R. C. ZUCKERMAN ET AL  2,261,324
BEET TOPPER
Filed Dec. 5, 1939  5 Sheets-Sheet 5

INVENTORS
R. C. Zuckerman
H. N. Bagley
BY
Webster & Webster
ATTORNEY

Patented Nov. 4, 1941

2,261,324

UNITED STATES PATENT OFFICE 2,261,324

BEET TOPPER

Roscoe C. Zuckerman and Henry N. Bagley, Stockton, Calif.; said Bagley assignor to said Zuckerman Application December 5, 1939, Serial No. 307,614

12 Claims. (Cl. 55—107)

This invention relates to machines for topping beets while still in the ground, our principal object being to provide a machine of this type and for this purpose which will automatically top beets the proper proportionate distance from their crowns irrespective of the size of the beets and the distance they correspondingly project out of the ground.

Another object is to provide manual means for adjusting the actual depth of the topping cut relative to the beet crown, while maintaining the proportionate relative distances on different size beets as above stated.

Still another object is to provide a topping mechanism arranged so that the forward pressure of the topping knife, tending to tilt the beet forward and thus obtain an undesired slanting or bias cut, is counteracted by a pressure acting in the opposite direction.

A further object is to provide a topping mechanism which may be readily steered sideways, as deviation in the alinement of the row or of the travel of the machine may require without having to steer the entire machine and its draft tractor.

Yet another object is to provide a machine having a number of topping units to operate independently on beets of a corresponding number of rows, and to mount these units for simultaneous steering, since any deviation of the machine as a whole relative to one row will also be had relative to the other rows being then topped.

These objects we accomplish by means of such structure and relative arrangement of parts as will fully appear by a perusal of the following specification and claims.

In the drawings similar characters of reference indicate corresponding parts in the several views.

Figure 1:
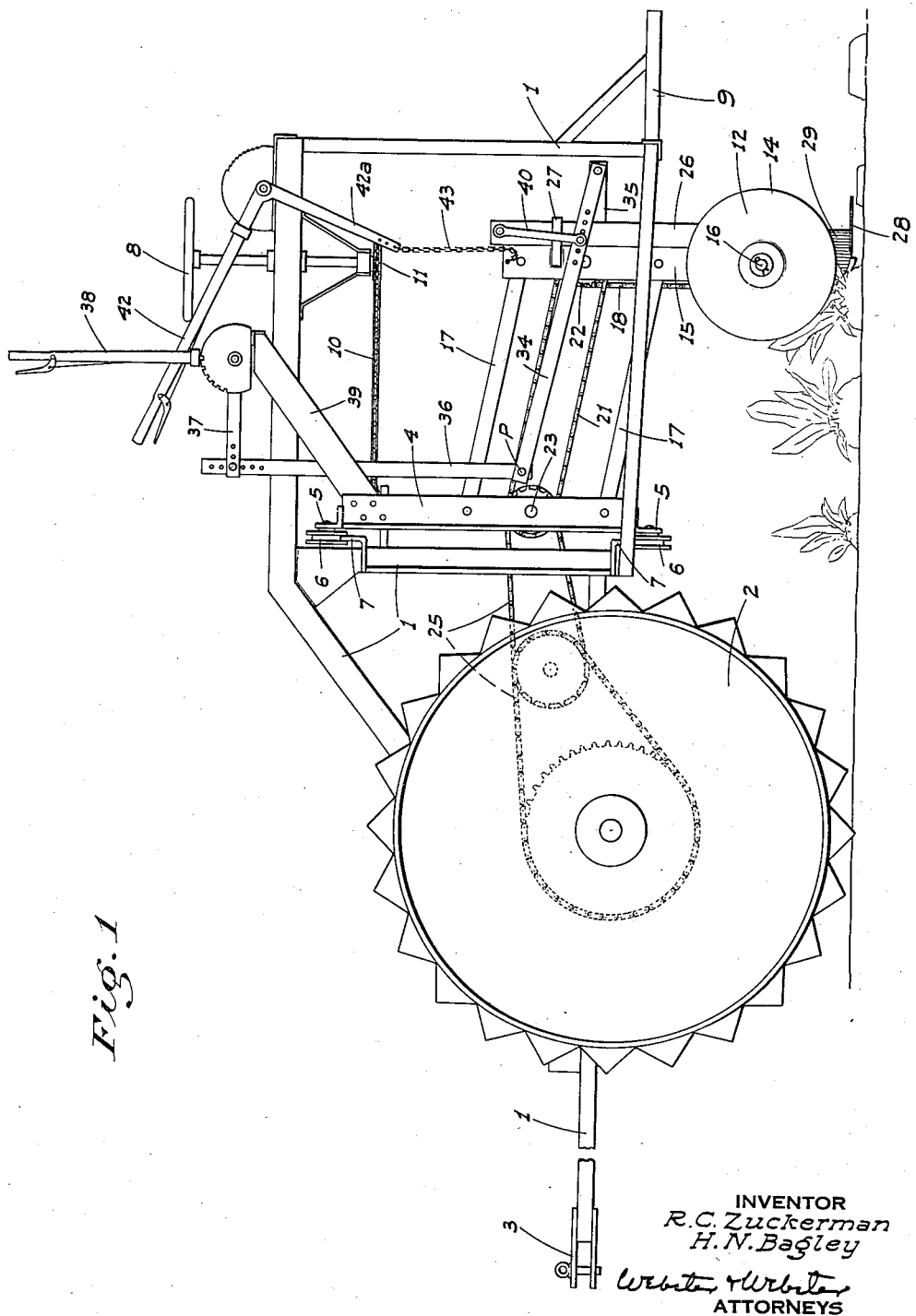
Figure 1 is a side elevation of my improved machine as in operation.

Referring now more particularly to the characters of reference on the drawings, the machine comprises a main frame 1 of suitable form supported intermediate its ends on a pair of cleated traction wheels 2 and provided at its forward end with a clevis 3 adapted for direct supported connection with a draft tractor.

An auxiliary frame, in connection with which the various topping units are mounted, includes transversely spaced uprights 4 and top and bottom transverse rails 5 rigid with the uprights. This frame is disposed just rearwardly of wheels 2, and rollers 6 are mounted on the rails 5 and ride on other rails 7 parallel thereto and forming part of the main frame. The auxiliary frame is thus supported from the main frame and may move laterally relative thereto. Such movement is imparted to the auxiliary frame when necessary by means of a suitable steering mechanism which includes a steering wheel 8 mounted on the main frame rearwardly of the auxiliary frame and operable from a standing platform 9 on the rear end of the main frame.

Figure 4:
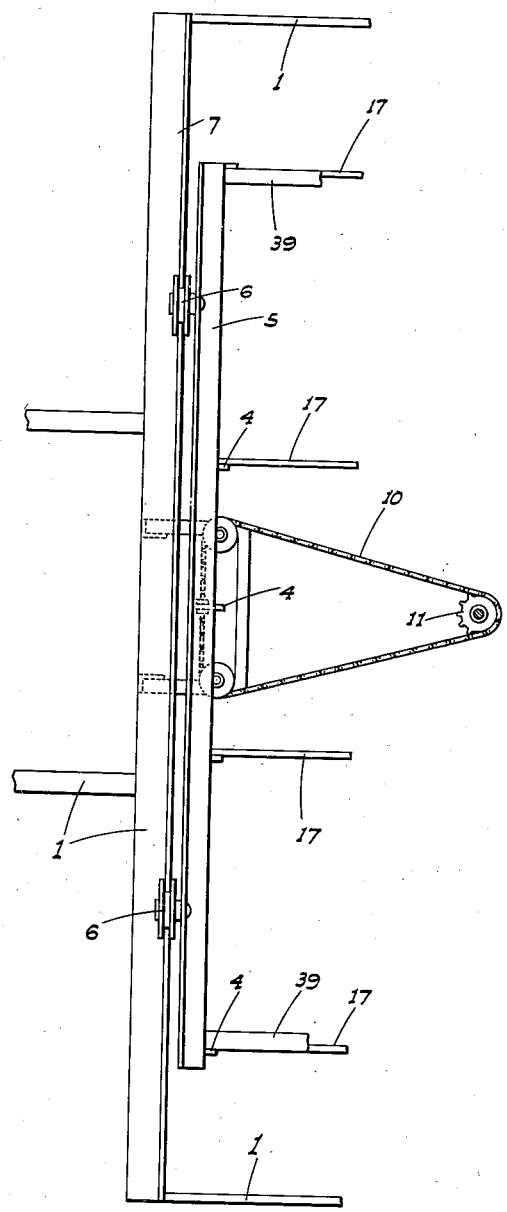
Figure 4 is a fragmentary and somewhat diagrammatic plan view of the frame structures showing the steerable mounting of the topping unit supporting frame relative to the main frame.
Figure 5:
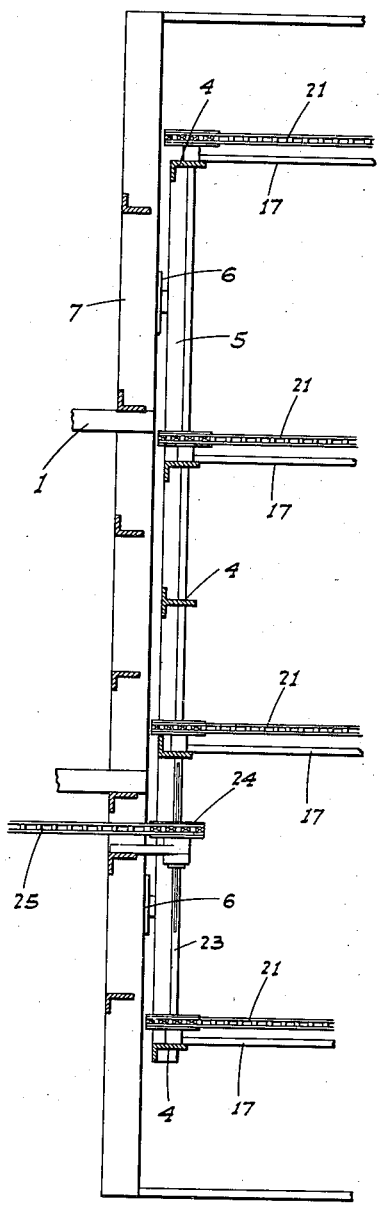
Figure 5 is a similar view showing the chain drive connections for the various topping units.

A steering chain 10 or similar flexible element engages a sprocket 11 fixed with the steering wheel and extends thence forwardly, with its opposed runs terminating at their forward end in facing relation and connected to one of the uprights 4 on opposite sides thereof as plainly shown in Fig. 4.

The steering or lateral shifting of the auxiliary frame is limited in extent, and is not of course intended to supplant the steering of the machine as a whole by the tractor, but to enable the topping units to be always maintained in proper alinement with the rows and which it is hard if not practicably impossible for the tractor operator ahead to do.

A number of topping units—preferably four—are mounted in connection with the auxiliary frame in transversely spaced relation corresponding to the spacing of the beet rows, and since all said units are identical, the description of one such unit only will suffice.

Each unit comprises a wide-tread gauge wheel 12 provided with short radial cleats 13 shrouded by a sharp edged flange 14. This wheel is of sufficient width to fully straddle the widest beet, and is actually made in two sections, spaced apart sufficiently to receive a standard 15 therebetween. The axial shaft 16 of the wheel sections is secured thereon, and is turnably supported in the standard.

The standard is mounted in connection with the auxiliary frame by vertically spaced parallel links 17 pivoted on the standard and one of the uprights 4. These links allow of unrestrained vertical movement of the standard and gauge wheel while holding the same against relative lateral movement. The gauge wheel is driven from and in the same direction as the wheels 2 but at a greater peripheral speed by means of a chain drive 18 between the shaft 16 on one side of the wheel and a stub shaft 19 on the standard between links 17, and which includes a sprocket 20 turnable on said stub shaft.

Another chain drive 21 including a sprocket 22 rigid with sprocket 20 extends in parallel relationship with the links 17 to a transverse shaft 23 supported from the various frame uprights 4.

Another sprocket 24 is splined on shaft 23 and is supported from the main frame against lateral movement relative thereto, this sprocket 24 being driven from one of the wheels 2 by a suitably arranged chain drive mechanism 25. In this manner, the gauge wheel may be constantly driven irrespective of its level or of its lateral position relative to the main frame.

A knife supporting standard 26 is disposed behind the standard 15 in sliding engagement therewith, such engagement being maintained by guide sleeves 27 on the standard 15, one such sleeve being at the lower end of the standard 15.

Figure 7:
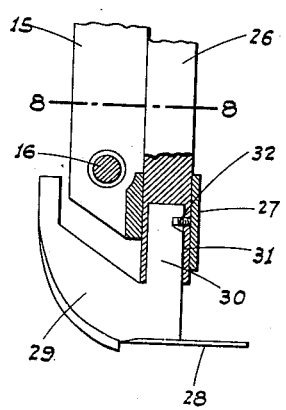
Figure 7 is a fragmentary side view, partly in section, of the blade and its mounting means.
Figure 8:
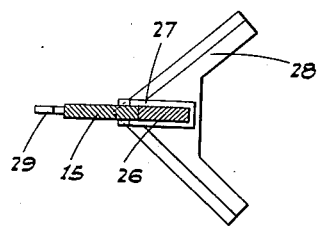
Figure 8 is a sectional plan on line 8—8 of Fig. 7.

A flat V-shaped knife 28, with its apex pointing forwardly, is located below standard 26 and the gauge wheel, in symmetrical relation therewith, said knife at its rear end being substantially as wide as the wheel. An upstanding centralizing splitter blade 29 is fixed rigid with the knife, with its sharp edge curving upwardly and forwardly from the apex of the knife, as shown. At its read end, this blade is formed with an upstanding tang 30 removably seated in a socket 31 formed in the lower end of standard 26 and held against undesired removal by a set screw 32 normally concealed by the lower sleeve 27 as shown in Fig. 7.

Figure 2:
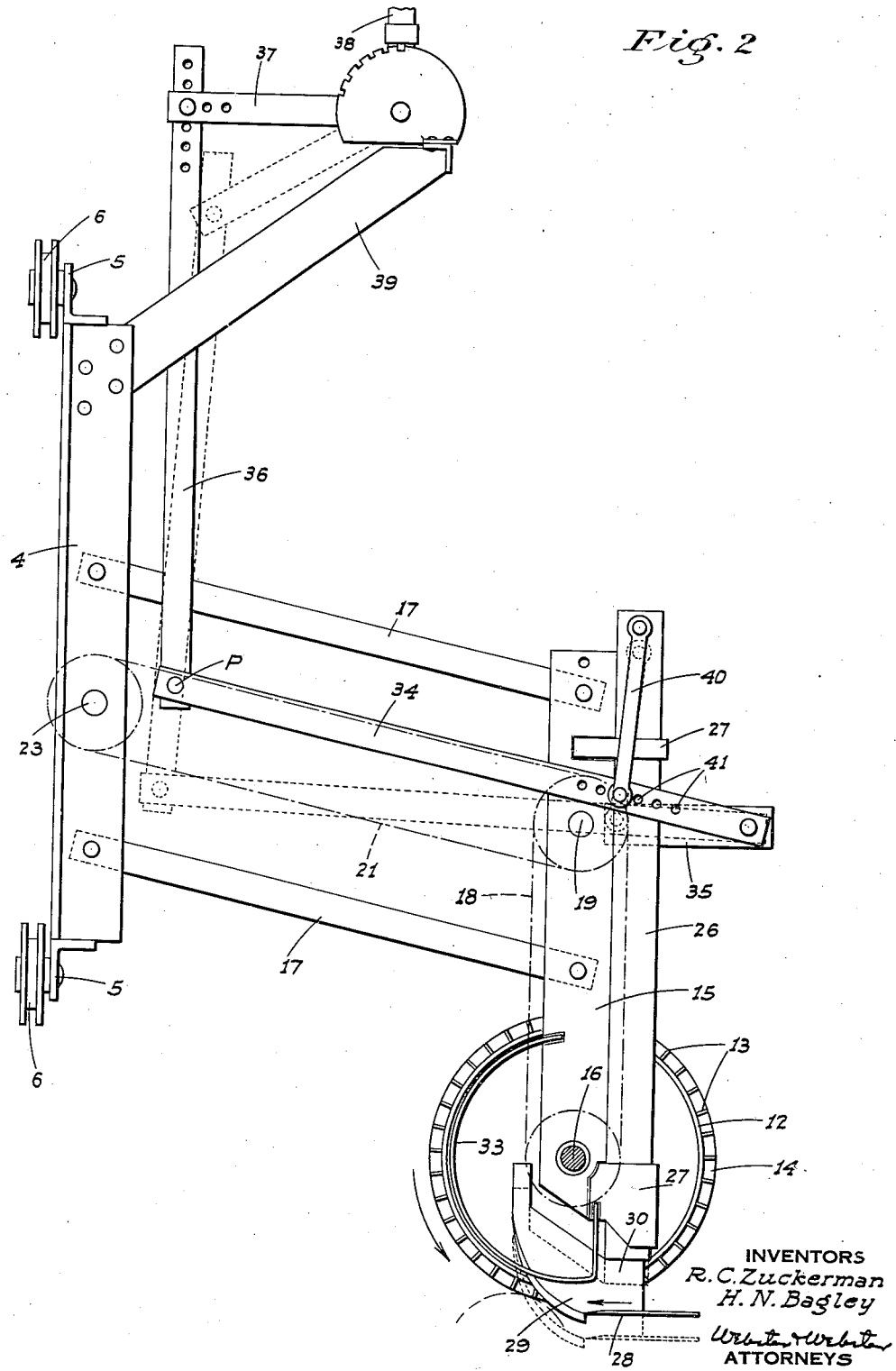
Figure 2 is a fragmentary enlarged side elevation of a topping unit showing the relative position of the gauge wheel and knife when about to top a beet of a certain size and height.
Figure 3:
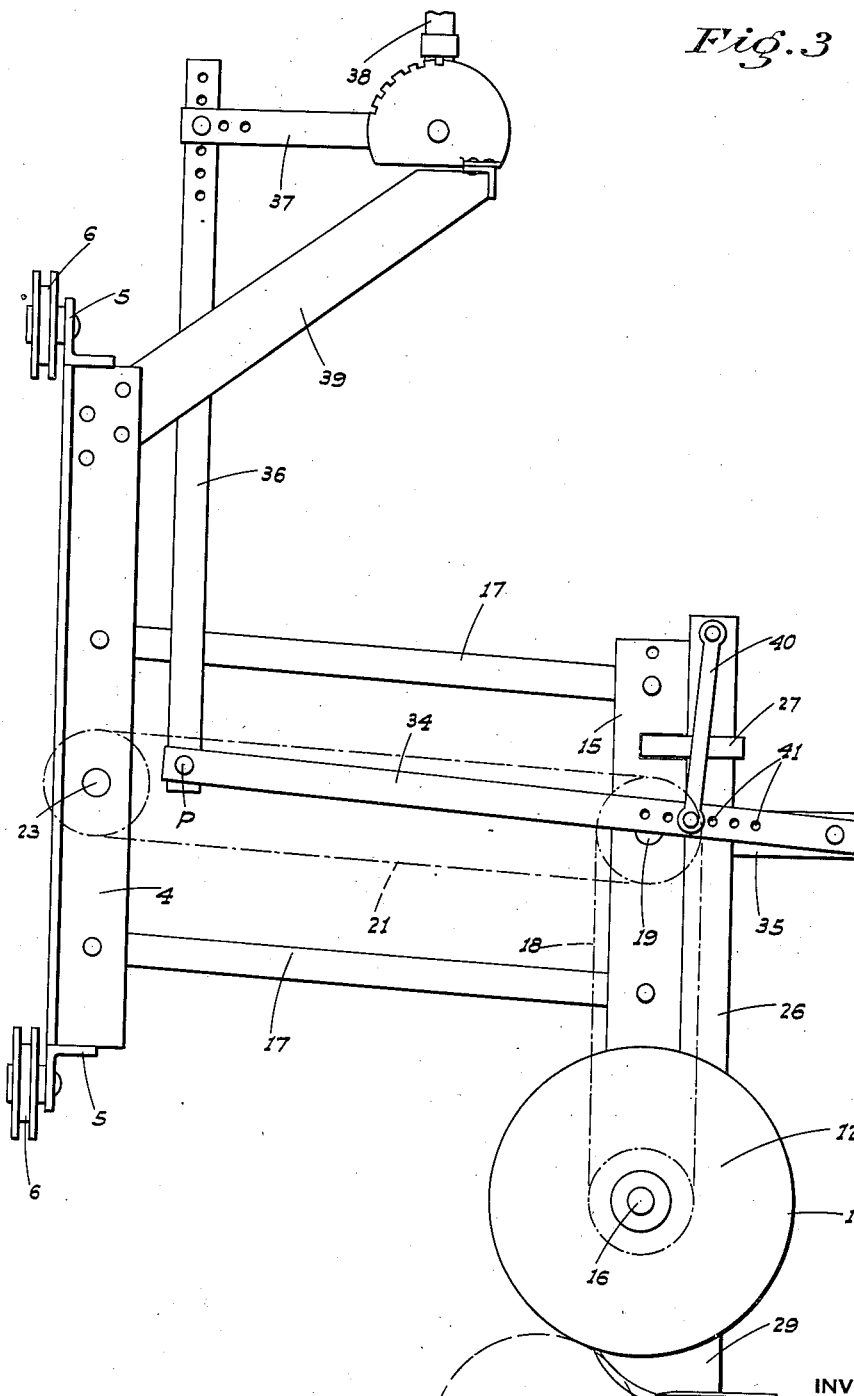
Figure 3 is a similar view showing the wheel and knife as about to top a larger and higher beet.
Figure 6:
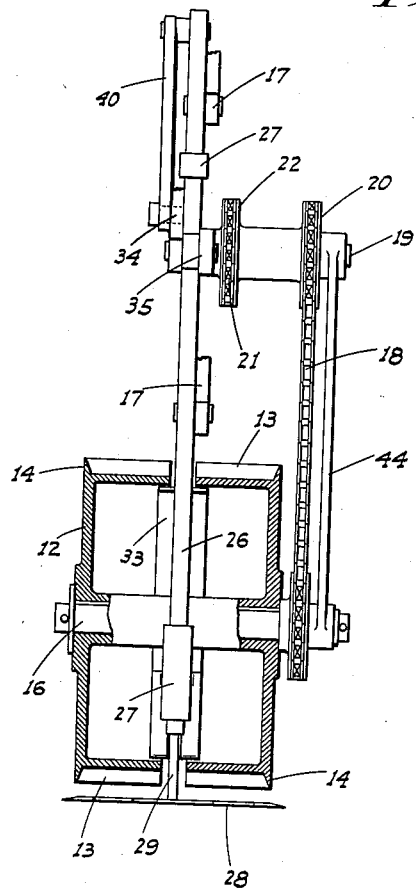
Figure 6 is a rear end view of a topping unit, with the gauge wheel in section.

In order to prevent dirt, etc. from getting between the wheel sections in sufficient quantities to possibly jam the same, a guard band or shield 33 is mounted radially inward of the tread rims of the wheel sections (which are hollow), and underlaps said rims as shown in Fig. 6. This band extends about the forward portion of the gauge wheel from a secured connection with the standard 15 at the top of the wheel to a similar connection with the lower sleeve 27, as shown in Fig. 2; the band being of course slotted where it passes across the upstanding blade 29 as indicated in Fig. 6.

An arm 34 extends from rearwardly of the standard 26 on the side opposite the chain drive 18 to a termination adjacent the auxiliary frame, the arm being located in a vertical plane between links 17. At its rear end, the arm is pivoted on a bracket 35 rigid with and projecting rearwardly from standard 15. At its forward end, the arm is connected by a pivot pin P to an upstanding link 36, which at its upper end is adjustably connected to an arm 37. This arm 37 is rigid with and projects radially from an upstanding control lever 38 supported on a bracket 39 rigid with and projecting rearwardly from the auxiliary frame so that said lever can be operated from platform 9. A rigid link 40 is pivoted at its upper end on standard 26 adjacent its upper end, and at its lower end is adjustably connected to arm 34 below at any one of a longitudinal row of holes 41 in the latter.

In order to raise the topping unit clear of the ground for transportation or when there is no row of beets to be topped by the particular unit, a bell crank lever 42 is mounted on the main frame adjacent its rear end (see Fig. 1), the lower arm 42a of the bell crank being connected by a normally slack chain 43 or the like to standard 15 at its upper end.

By reason of the above described construction and mounting of the topping unit, it will be seen that with upward movement of the gauge wheel from adjacent the ground,—its lowest possible operating position—the arm 34 is raised the same amount at its extreme rear pivoted end, but a lesser amount forwardly of such end, since the forward pivot P is relatively stationary, and the arm and topping unit may be considered as swinging about such pivot. As a result, the knife standard 26, which is connected to arm 34 by link 40, is also raised but to a lesser extent than the gauge wheel. It will also be seen that the degree of such lesser extent of movement depends on which of the holes 41 the link is connected to, since the actual amount of lift of arm 34, and consequently of the knife standard and knife, becomes decreasingly less at all points forward of its rear end.

Therefore, as the gauge wheel engages and rides a small beet, which naturally projects but slightly from the ground, the knife remains relatively close to the wheel, and the beet is topped an actual short distance from the crown, as is desirable to avoid either retaining an undesirable portion of the beet, or wasting a valuable sugar containing part of the same.

When, however, the gauge wheel lifts the greater amount necessary to ride on a large beet which naturally projects higher from the ground, the knife is raised a lesser distance as above pointed out, so that while actually spaced farther below the wheel than when the latter is engaging a small beet, the same relationship of the knife and wheel for topping the correct proportion of the large beet, as for the small beet, is maintained.

In other words, the wheel and knife always move relative to each other, so that the proper differential for all sizes of beets is maintained. The degree of difference is governed by adjusting the point of connection of link 40 with an arm 34, while the actual initial vertical spacing of the knife from the wheel, without affecting or altering the differential action, is determined by manipulation of lever 38, which alters the level of pivot P and consequently raises or lowers the knife standard 26 relative to the wheel standard 15, without altering the level of the latter.

It will be noted that since the gauge wheel, as previously stated, is rotating at a greater speed than the forward movement of the machine, it exerts a rearward pressure on the beet engaged thereby. Therefore, when the knife engages the beet and tends to press and tilt it forwardly, such forward pressure is counteracted by that exerted on the beet by the wheel. As a result, the beet is maintained straight, and a straight cut is made thereon as is desirable.

The tractor hauling the machine is of course manipulated to steer the latter with reasonable accuracy along the rows of beets, and any slight unavoidable deviation from the necessary straight line of travel is taken care of by the operator standing on platform 9, who actuates the steering wheel 8 so as to shift the topping units simultaneously to the right or left so that the gauge wheels and knife are accurately alined with the different rows of beets. It will of course be understood that the main frame is connected to the tractor so that the machine cannot tip down rearwardly about the wheels 2, so that there is no up and down movement of the machine rearwardly of the wheels which would affect the desired and proper action of the topping units.

In order to prevent possible pulling together of the shafts 19 and 16, and also to provide additional bearing for the same, a stabilizing or spreader arm 44 connects the two shafts on the same side as and laterally out from the chain drive 18.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. A beet topping machine comprising a frame adapted to be drawn along the ground, said frame including spaced transverse rails, an auxiliary frame, means supporting the auxiliary frame from the rails for controlled lateral movement along the same, a topping unit rearwardly of the auxiliary frame, and means mounting said unit in connection with the auxiliary frame for horizontal and lateral movement therewith and direct vertical movement relative thereto.

2. A beet topper comprising a gauge wheel to ride on a beet, means mounting said wheel for movement along the ground, said wheel comprising a pair of transversely spaced sections, a standard between the sections, a wheel axle projecting through and mounted in the standard and a topping knife directly supported from the lower end of the standard in depending relation thereto and below the wheel and symmetrically disposed relative to the wheel sections.

3. A beet topping machine comprising a frame adapted to be drawn along the ground, a gauge wheel to successively ride the beets of a row, a standard mounted in unitary connection with the wheel, means connecting the standard and frame for relative vertical movement, a knife standard disposed in vertically slidable relation to the first standard, a topping knife on said knife standard below the wheel, and means between the standards and the frame to impart vertical movement to the knife standard with vertical movement of the first standard but to a different extent.

4. A machine as in claim 3, in which said last named means comprises an arm projecting forwardly from and pivoted at its rear end in connection with and adjacent the first standard, a relatively fixed pivot connection between the arm and frame at the forward end of the arm, and a substantially vertical link connecting the knife standard and the arm at a point on the latter ahead of its rear end.

5. A machine as in claim 3, in which said last named means comprises an arm projecting forwardly from and pivoted at its rear end in connection with and adjacent the first standard, a relatively fixed pivot connection between the arm and frame at the forward end of the arm, and a substantially vertical link connecting the knife standard and the arm at a point on the latter ahead of its rear end, and means to alter the point of connection of the link with the arm lengthwise of the latter.

6. A machine as in claim 3, in which said last named means comprises an arm projecting forwardly from and pivoted at its rear end in connection with and adjacent the first standard, a relatively fixed pivot connection between the arm and frame at the forward end of the arm, and a substantially vertical link connecting the knife standard and the arm at a point on the latter ahead of its rear end, and means to adjust said pivot connection vertically.

7. A beet topping machine comprising a frame adapted to be drawn along the ground, a gauge wheel to successively ride the beets of a row, a standard mounted in unitary connection with the wheel, means connecting the standard and frame for relative vertical movement, a knife standard disposed immediately behind the first standard and slidably engaging the back side thereof, vertically spaced guide collars for said knife standard fixed on the first standard, a topping knife supported from the lower end of the knife standard below the wheel, instrumentalities between the standards and frame to impart vertical movement to the knife standard with similar movement of the first standard in the same direction but to a different extent, the knife standard being formed with an upwardly projecting socket in its lower end, a tang upstanding from the knife and removably fitting the socket and a set screw countersunk in the knife standard and engaging the tang, said set screw being normally concealed by the lower collar guide.

8. A beet topper comprising a standard, means mounting the standard for movement along the ground, a gauge wheel to ride on a beet and comprising spaced sections disposed on opposite sides of the standard, means supporting the wheel from the standard, a horizontal topping knife disposed below the wheel in symmetrical relation to the sections thereof, means mounting said knife in connection with the standard, an upstanding splitter blade mounted rigid with the knife and projecting upwardly between the wheel sections ahead of the forward end of the knife, the wheel sections being formed with tread rims; and a shield band extending about the forward portion of the wheel between the sections radially inward of and overlapping the rims, the band being secured at its ends on the standard and being slotted to receive the upstanding blade therethrough.

9. A beet topping machine comprising a main frame movable along the ground, an auxiliary frame mounted on the main frame for lateral movement thereto, means between the frames to control such movement, a topping unit including a gauge wheel and a topping knife associated therewith and movable vertically relative thereto, means supporting the unit from the auxiliary frame and control means mounted on the auxiliary frame and applied to the unit to alter the initial setting of the knife relative to the wheel.

10. In a beet topper including a gauge wheel comprising transversely spaced sections and a topping knife associated with the wheel, cleats projecting outwardly from the wheel sections, and sharp edged flanges shrouding the cleats and projecting about the sections from their laterally opposed edges.

11. In a beet topper, a gauge wheel comprising transversely spaced sections, a topping knife below the wheel, an upstanding splitter blade projecting between the wheel sections and means mounting the wheel, knife and blade together as a unit; the wheel sections being formed with tread rims, a shield band extending circumferentially about the forward portion of the wheel radially inward of and overlapping the rims, said band being slotted to receive the upstanding blade therethrough and means securing the band against movement relative to said mounting means.

12. In a beet topper, a mounting standard, a topping knife below the standard, a knife standard, guide means on said mounting standard slidably mounting the knife standard, said knife standard having a socket in its lower end, a tang upstanding from the knife and removably fitting the socket and a set screw countersunk in the knife standard and engaging the tang and normally concealed by said guide means.

ROSCOE C. ZUCKERMAN.
HENRY N. BAGLEY.